United States Patent Office 3,763,238
Patented Oct. 2, 1973

3,763,238
N-(PENTACHLOROBIPHENYL) ETHYLENE DIAMINE
John J. Merianos, Jersey City, N.J., Edward Griffin Shay, Suffern, N.Y., and Philip Adams, Murray Hill, and Alfonso N. Petrocci, Glen Rock, N.J., assignors to Miilmaster Onyx Corporation, New York, N.Y.
No Drawing. Original application Dec. 9, 1969, Ser. No. 883,636, now Patent No. 3,663,620, dated May 10, 1972. Divided and this application Mar. 15, 1972, Ser. No. 234,987
Int. Cl. C07c 91/16
U.S. Cl. 260—570.5 P    1 Claim

ABSTRACT OF THE DISCLOSURE

Microbiocidal ammonia and amino substituted halogenated biphenyls, as well as the nitrogen derivatives thereof such as quaternary ammonium compounds, amine oxides, imidazolines, amides, enamines, ampholytes, and the like.

The ammonia and amino halobiphenyls are prepared by reacting the ammonia or the amine and the halobiphenyl reactants in such a manner that the ratio of amine to halobiphenyl is preferably limited to between two and five mols of amine to each mol of halobiphenyl.

---

This is a division of co-pending application Ser. No. 883,636, filed Dec. 9, 1969 and now U.S. Pat. No. 3,663,620.

This invention relates to amino derivatives of halogenated biphenyls and mixtures thereof, which have marked antimicrobial efficacy, and to the use thereof for treating industrial water; for the preservation of metalworking fluids; for use in germicidal detergent-type surface-active agents, including both synthetic and natural detergents, but especially soaps; and for the preservation of cosmetics and the like.

The compounds employed in the invention comprise (a) the mono-aminosubstituted halogenated biphenyls having the general structure:

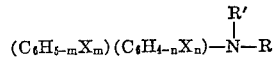

wherein $m$ is an integer from 0 to 5, $n$ is an integer from 0 to 4, X is a halogen, and there is at least one halogen atom, R and R' being either selected from the group consisting of hydrogen, alkyl, and hydroxyalkyl, or the residue of an amine or a polyamine, or are part of a cyclic amine structure; and wherein R and R' may be either the same or different, and may be part of a polyamine; or (b) the bis-aminosubstituted halogenated biphenyls having general structure:

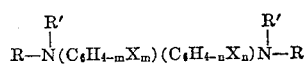

in which $m$ and $n$ are integers from 0 to 4, X, R and R' are the same as above and there is at least one halogen atom, either separately or admixed; and with or without a content of unreacted halobiphenyl. In every case, X may be fluorine, chlorine, bromine, or iodine.

In addition to their own inherent microbiocidal activity, these amino compounds can be used as intermediates for the preparation of a variety of other nitrogen compounds having antimicrobial powers. Among such are quaternary ammonium compounds, tertiary amine oxides, imidazolines, ampholytes, Schiff's bases, amides, metal-amino coordination compounds, and, in general, antimicrobial derivatives of the amino group or groups to which the polyhalobiphenyl portion additionally contributes its own characteristics, such as, for example, a high degree of fire retardancy.

By limiting the ratio of the amine or ammonia relative to the polyhalobiphenyl, preferably to between about two and five mols of amine for each mol of polyhalobiphenyl, a predominant amount of the monoamino substituted compounds are obtained. Above five mols, increasing amounts of the bis-compounds occur, and at ten mols or more the diamino compounds predominate. In the following examples so conducted essentially the monoamino compounds were obtained.

Where the chlorinated compounds are disclosed in the examples, the fluorinated, brominated, or iodinated compounds may be substituted in each case for the chlorinated compounds to obtain generally the same desired results.

As a source of raw materials, the "Aroclors" (polychlorinated polyphenyls—Monsanto) provided a range of polychlorinated biphenyls, e.g. "Aroclor 1260" (said to contain 60% of chlorine) and "Aroclor 1268" (said to contain 68% of chlorine). Others with other chlorine content, especially "Aroclors" 1232, 1242, 1248, 1254, and 1262, having content of about the percent by weight represented by the last two digits in each case, were also reacted, but the reaction rates of the members containing lesser amounts of chlorine were lower. In the case of these members, the addition of catalytic amounts of cuprous chloride or ferric chloride accelerated the reaction.

The halobiphenylamino compounds of the invention may be employed either as the free amines or as their salts of inorganic or organic acids in order to improve their compatibility with aqueous, oily or solvent systems or to satisfy pH requirements. Such acids may include, for example, hydrochloric, sulfuric, phosphoric, acetic, lauric, oleic, gluconic, oxalic, tartaric, citric, benzoic and substituted benzoic, paratoluene sulfonic, sulfamic, and the like.

The following examples are intended to be descriptive; but not to limit the invention except as claimed.

EXAMPLE 1

A one liter, three-necked round-bottomed flask fitted with an agitator, a thermometer and a reflux condenser, was charged with 360 grams (or one mol) of "Aroclor 1260," and 310 grams (or three mols) of diethylene triamine. The mixture was stirred thoroughly for 8 to 10 hours at 150°–165° C. at atmospheric pressure until a snatch sample, taken under active agitation and dissolved in mixed isopropanol and water, indicated, by argentometric titration, that the reaction was essentially complete. The amine hydrochloride formed in the course of the reaction tended to separate to the top.

The reaction mixture was cooled to about 50° C. and it was then drowned in aqueous hydrochloric acid, the amount of the latter being adjusted to give a pH of about 5 to 6. A clear solution was obtained, with a concentration of 25% to 45% by weight at room temperature.

A representative sample of this solution was made alkaline to about pH 10 by the addition of caustic soda. A gummy mass separated, which liquified on heating to about 70° C. or higher. This was washed several times with hot water, and then dried.

The yield was essentially the theoretical, and calculated 95% as the monosubstituted product, by equivalent weight titration in non-aqueous medium with perchloric acid, as crude N-(pentachlorobiphenyl)-diethylene triamine.

EXAMPLE 2

In the apparatus of Example 1, 500 grams (or one mol) of "Aroclor 1268" (assaying 70% Cl) and 310 grams (or three mols) of diethylene triamine were reacted in a similar manner by heating slowly to about 120° C., then at 125°–130° C. for about four hours until the reaction was complete, as indicated by argentometric titration. The same finishing procedure as in Example 1 was utilized to yield the theoretical amount of N-(nonachlorobiphenyl) diethylene triamine.

EXAMPLE 3

In apparatus similar to that of Example 1, and in a similar manner, 146 grams (or 0.5 mol) of "Aroclor 1248" and 256 grams (or 2.5 mols) of diethylene triamine were reacted by heating at 180°–190° C. for 36 hours. After 15 hours, reaction was 50% complete and after 36 hours, it was 99% complete, as determined by argentometric titration. The excess amine was distilled off and 150 grams was recovered. The residue was treated with aqueous hydrochloric acid to yield a 30% active clear solution of amber color at pH 6.6.

The product so obtained was made alkaline with caustic soda, and the separated N-(trichlorobiphenyl)-diethylene triamine was washed and dried. It calculated 95%, by perchloric acid titration in non-aqueous medium.

EXAMPLE 4

In the same way, instead of being reacted with diethylene triamine, the polychlorobiphenyls were reacted with aliphatic and alicyclic polyamines such as ethylene diamine; 1,3-diaminopropane, dimethylaminopropylamine, triethylene tetramine, tetraethylene pentamine, hexamethylene-diamine, isophorone-diamine, ethanolamine, diethanolamine, hydroxyethylethylene diamine, piperazine and aminoethyl piperazine, to yield the corresponding polychlorobiphenylamino derivatives, as the monosubstituted compounds. The reaction may also be carried out instead with primary or secondary alkylamines in similar fashion. Representative of these alkylamines are hexyl, octyl, nonyl, undecyl, dodecyl, tetradecyl, hexadecyl, octadecyl and octadecenyl amines.

The above amino derivatives of polychlorobiphenyls were employed as intermediates for the synthesis of nitrogen-bearing derivatives exemplified by the following types:

EXAMPLE 5

The products of Examples 1–4, such as do not already contain a tertiary amino group, were first alkylated on an amino nitrogen by methods well known to the art (for example, by reaction with formaldehyde and formic acid) to form tertiary amines; these were then quaternized, as in the present example; or converted to their tertiary amine oxides, as in the following Example 7.

The quaternizing agents included such compounds as the alkyl halides, the substituted or unsubstituted benzyl halides, α-chloro-methylnaphthalene, dimethyl sulfate, and the like.

For example, 55 grams (or 0.1 mol) of N-(nonachlorobiphenyl) aminopropyl-N',N'-dimethylamine and 17 grams (or 0.1 mol) of n-hexylbromide were dissolved in 100 grams of isopropanol. The mixture was heated under reflux at atmospheric pressure at 85°–95° C., for from 12 to 24 hours until reaction was essentially complete. The clear red to brown solution contained 87% of the theoretical of N-(nonachlorobiphenyl) aminopropyl-N',N'-dimethyl-N'-hexyl ammonium bromide.

Similarly, the n-octyl, n-decyl, n-undecyl, n-dodecyl, n-tetradecyl, n-hexadecyl and n-octadecyl bromides were reacted to form the corresponding quaternary ammonium bromides.

Other quaternary ammonium salts were prepared, employing respectively, benzyl, ethylbenzyl, dichlorobenzyl and trichlorobenzyl halides; trimethylbenzyl halide; 2-methyl-5-isopropyl benzyl halide; and chloromethylnaphthalene. In such instance, the halide may be chloride or bromide.

EXAMPLE 6

258 grams (or one mol) of Aroclor 1242 and 322 grams (or about 7.5 mols) of ethanol were charged into an autoclave. To this was added 85 grams (or five mols) of liquid ammonia, after which the autoclave was sealed and heated with agitation to about 275° C. under autogenous pressure for about five hours. The autoclave was cooled and the excess ammonia was released into an absorber. The charge was drowned in dilute hydrochloric acid and the unreacted "Aroclor" was separated. The filtrate was made alkaline with caustic soda and the crude product was separated and dried, as a brown solid, in 131 grams or 55% yield of dichlorobiphenylamine. The nitrogen content was 5.6% (theory=5.85%).

EXAMPLE 7

From the tertiary amines prepared as in Example 5, the corresponding tertiary amine oxides were prepared. For example, 55 grams (or 0.1 mol) of N-(nonchlorobiphenyl) - aminopropyl-N',N'-dimethylamine was dissolved in 100 grams of isopropanol and the solution was heated at 60°–75° C. at atmospheric pressure under reflux and agitation, while adding gradually 20 grams (or 0.12 mol) of 35% aqueous hydrogen peroxide. The heating was continued for about 3 to 4 hours until the reaction was essentially complete and most of the excess hydrogen peroxide had decomposed. The product, N-(nonachlorobiphenyl) aminopropyl N',N'-dimethylamine-N'-oxide so obtained exhibited antimicrobial activity.

Instead of hydrogen peroxide, organic peroxides or ozone may be used.

EXAMPLE 8

Into a one-liter round-bottomed flask fitted with an agitator, a thermometer, and a Dean and Stark water collection apparatus, were charged 52.4 grams (or 0.1 mol) of N-(nonachlorobiphenyl) ethylenediamine and 14 grams (or 0.1 mol) of p-hydroxybenzoic acid, along with 500 ml. of dry toluene. The mixture was agitated and heated until the mixture refluxed freely, and about 1.7 ml. of water was collected, during about 3½ to 4 hours.

About 250 ml. of the toluene was stripped off, and the residue was cooled in an ice bath. The precipitated product was filtered and dried. A Kjeldahl determination showed a nitrogen content of 4.13% (theoretical 4.36%).

This product, N - (nonachlorobiphenyl) - aminoethyl-N'-p-hydroxybenzamide proved effective at 0.1% in the preservation from microbial decomposition of a wheat gluten paste.

Similarly, salicylic acid, 2,4,5-dichlorobenzoic acid, and nicotinic acid were reacted with N-(nonachlorobiphenyl) ethylene diamine and N-(pentachlorobiphenyl) diethylene triamine, to produce their corresponding amides.

EXAMPLE 9

The polychlorobiphenylamino derivatives of Examples 1–4, such as have a terminal primary amino group, were reacted with substituted or unsubstituted aldehydes, and particularly aromatic aldehydes, to produce Schiff's bases. These displayed moderate anti-microbial activity.

EXAMPLE 10

Metal-amino coordination products were prepared by methods exemplified by the following procedure, from the products of Examples 1–4: 13.6 grams (or 0.1 mol) of anhydrous zinc chloride and 300 ml. of dry toluene were charged into a round-bottomed flask fitted with an agitator, a thermometer, a reflux condenser and a dropping funnel. The mixture was heated at 40° C. while gradually adding a mixture of 157 grams (or 0.3 mol) of N-(nonachlorobiphenyl) ethylenediamine and 600 ml. of toluene. When the addition was complete, the mixture was heated for about two hours at the reflux temperature at atmospheric pressure.

After cooling to room temperature, the suspension was filtered off, to yield tris-[N-(nonachlorobiphenyl) ethylene diamine] $ZnCl_2$.

This product was particularly effective in the preservation of paint films against fungal attack.

EXAMPLE 11

The related compounds were prepared by substituting for zinc chloride other salts such as $BCl_3$, $CuCl_2$, $AlCl_3$, $MnCl_2$, $MgCl_2$, $CoCl_2$, and the like, the amount of each varying with the molecular weight.

Using essentially the same procedure as in Example 10, their corresponding metal-amino-products were made using the monoamino substituted polyhalobiphenyls synthesized as in Examples 1–4, the amount of each varying with its respective molecular weight.

EXAMPLE 12

The polybromobiphenyls may be prepared by brominating biphenyl in the presence of catalysts such as iodine, iron or aluminum, and along with agents such as sulfuric acid or chlorine, by methods known to the art. Such are described, for example, in British Pat. No. 934,970 and German Pats. Nos. 1,136,683 and 1,161,547.

The bromobiphenyls react with the amines and with ammonia in the same way as the chlorobiphenyls.

EXAMPLE 13

The "Aroclors" may be converted to fluorinated biphenyls, with or without one or more residue halogen atoms, by fluoroination followed by dehydrohalogenation, by which process fluorine addition products of the chlorobiphenyls are formed, which are then rendered aromatic again by the reaction of caustic alkali, removing hydrogen and chlorine. This procedure is described in V. Grakauskas' "Direct Liquid Phase Fluorination of Halogenated Aromatic Compounds," in the Journal of Organic Chemistry, vol. 34, No. 10, pp. 2835–39 (October 1969).

The polyfluorobiphenyls react with amino compounds in the same way as the "Aroclors," to yield the corresponding fluoro-derivatives.

EXAMPLE 14

The polyiodinated biphenyls are also prepared by methods known to the art, for example, by reaction of "Aroclors" with KI.

These, too, react with amino compounds to yield the corresponding iodobiphenyl derivatives.

EXAMPLE 15

In the apparatus of Example 1, 326 grams (or one mol) of "Aroclor 1254" and 1,030 grams (or ten mols) of diethylene triamine were charged. The mixture was heated under agitation at the reflux temperature, about 205° C., at atmospheric pressure for about 40 hours.

A snatch sample was titrated argentometrically and was found to contain 5.5% of ionic chlorine. Theory for (trichlorobiphenyl)-bis-diethylene triamine is 5.25%.

The excess diethylene triamine was distilled off under 10–20 mm. pressure; the cooled residue was drowned in water containing caustic soda. The product layer was separated, washed and dried by heating at 100°–120° C. at 10–20 mm. pressure to a brown paste. Titration with acid indicated an equivalent weight of 126, the theoretical being 115.

EXAMPLE 16

In a similar manner, the bis-aminosubstituted derivatives of diethylene triamine with "Aroclors" 1242, 1248, 1260, 1262, and 1268 were prepared.

EXAMPLE 17

The bis-aminosubstituted derivatives of the above "Aroclors" were prepared with ammonia and the amines of Examples 1 to 4 and 6, employing the techniques described therein.

EXAMPLE 18

For antimicrobiocidal evaluation of certain of the above compounds, the Standard Broth Inhibition test method was employed. Aliquots of the test materials were added to appropriate broth culture media contained in test tubes so that various concentrations of the test material in culture media were obtained. The tubes so prepared were inoculated with either 24 hour broth cultures of the test bacteria, or 14 day aqueous spore suspensions of the test fungi, or 7 day broth cultures of the algae. The inoculated tubes were incubated as follows: bacteria for 72 hours at 37° C.; fungi for 14 days at 28° C.; algae for 7 days at 25° C. Following the aforementioned incubation period, the tubes were examined for the presence or absence of macroscopic growth. The lowest concentration of test material in the broth which does not permit macroscopic growth is designated as the "Minimum Inhibitory Level."

In the following tables, these abbreviations of the designations of the organisms are employed: E. c.=Escherichia coli; S. f.=Streptococcus faecalis; Ps. a.=Pseudomonas aeruginosa; A. n.=Aspergillus niger; P. e.=Penicilum expansum; C. p.=Chlorella pyrenoidosa.

Certain representative quaternary ammonium salts of Example 5 were tested for static level of inhibition. These were the N-(nonachlorobiphenyl) aminopropyl-N',N'-dimethyl-N'-alkyl ammonium bromides. The values are in parts per million of the quaternary.

TABLE 1

| Alkyl | Gram negative | | Gram positive | | Fungi, P.e. | Algae, C.p. |
|---|---|---|---|---|---|---|
| | E.c. | Ps.a. | S.f. | A.n. | | |
| $C_6$ | 50 | 250 | 5 | 100 | 1,000 | 1 |
| $C_8$ | 50 | 250 | 1 | 50 | 500 | 1 |
| $C_{10}$ | 1,000 | 1,000 | 50 | 500 | >1,000 | 10 |
| $C_{12}$ | 500 | 500 | 10 | 500 | >1,000 | 10 |
| $C_{14}$ | 500 | 1,000 | 50 | >1,000 | >1,000 | 10 |

EXAMPLE 19

Certain derivatives of tri-penta- and nona-chlorobiphenyl amino compounds of Examples 1–4, were treated bacteriologically for minimum inhibition levels as the free amines and their salts.

For the sake of brevity, they are referred to in the following Table 2 in terms respectively of "$Cl_3$," "$Cl_5$," and "$Cl_9$"; with respect to the parent amine, ethylene diamine is referred to as "E.D."; propylene diamine is referred to as "P.D."; diethylene triamine is referred to as "D.T."; triethylene tetramine is referred to as "T.T."; dimethylaminopropylamine is referred to as "DMAPA"; isophorone diamine is referred to as "I.D."; and hexamethylene diamine is referred to as "H.D."

TABLE 2

| Compound | E.c. | Ps.a. | S.f. | A.n. | P.e. | C.p. |
|---|---|---|---|---|---|---|
| $Cl_5$E.D | 10 | 250 | 10 | 10 | 50 | 1 |
| $Cl_9$DMAPA | 50 | 100 | 5 | 50 | 500 | 1 |
| $Cl_9$D.T | 1 | 1 | 10 | 1,000 | 1,000 | 1 |
| $Cl_5$D.T | 5 | 50 | 10 | | | |
| $Cl_5$T.T | 10 | 100 | 10 | | | |
| $Cl_5$I.D | >1,000 | >1,000 | >1,000 | >1,000 | >1,000 | 750 |
| $Cl_9$I.D | >1,000 | >1,000 | >1,000 | >1,000 | >1,000 | 750 |
| $Cl_9$P.D | 10 | 100 | 100 | 1,000 | 1,000 | 50 |
| $Cl_9$E.D | 10 | 100 | 100 | 1,000 | 1,000 | 10 |
| $Cl_3$D.T | 1 | 5 | 5 | 10 | 10 | 1 |
| $Cl_5$H.D | 10 | 500 | 50 | 50 | 10 | 10 |
| $Cl_9$H.D | 50 | 1,000 | 50 | 500 | 1,000 | 50 |

EXAMPLE 20

N-(nonachlorobiphenyl) - aminopropyl-N',N'-dimethylamine was formulated as an 0.5% solution, by weight, in an acetone-aqueous soap solution. A stock soap solution was first prepared at 10% concentration; 10 parts of this, 63 parts of acetone, 27 parts of distilled water and 0.5 part of the product were mixed.

A 0.5% solution of the product was similarly prepared, substituting distilled water for the 10 parts of aqueous soap solution.

The bacteriostatic levels were determined on the "Soap" and "No Soap" solutions and are, given in the following Table 3, in terms of parts per million of the product, and of Growth/No Growth against *Escherichia coli*.

TABLE 3

N-(nonachlorobiphenyl) aminopropyl-

Soap _____ 150/200
No soap _____ 10/50

The effectiveness of the aminosubstituted halobiphenyls as soap bacteriostat is clearly shown above, and also in the following test. This is especially significant since it is notorious that most soap bacteriostats are not very active against gram negative bacteria.

EXAMPLE 21

Sterile soap solution was prepared at 2.5% soap solids; N-(nonachlorobiphenyl) - aminopropyl - N,N' - dimethylamine was added to aliquots of this solution at 0.1% by weight, or 1,000 parts per million in the solution, and at a soap to product ratio of 25:1. For purposes of comparison, "Phisohex" (a proprietary product of Winthrop Laboratories, Division of Sterling Drug, Inc.) containing surface-active agents and 3% of 2,2'-methylene-bis-(3,4,6 trichlorophenol) was diluted with distilled water, also at the 1,000 p.p.m. level of bacteriostatic agent.

100 ml. aliquots of the respective solutions were transferred to Erlenmeyer flasks maintained at 25° C. and were inoculated with 1 ml. of an aqueous suspension of a 24 hour agar growth of *Escherichia coli*.

At intervals of three and five minutes after inoculation, aliquots of each of the solutions were plated into nutrient agar to determine the number of surviving bacteria. The number of survivors after five minutes was compared with the number initially present, from which figures the percent of organisms killed was computed. The following percentages are the average of replicate counts.

TABLE 4

Percent of *Escherichia coli* killed in five minutes

|  | Percent |
|---|---|
| "Phisohex" | 94.3325 |
| Cl₉DMAPA | 99.3631 |

The present compounds are equally effective in synthetic detergents such as the fatty alcohol sulfates, and ether sulfates, and the alkylaryl sulfonates. The "Maprofix WA" series and "Maprofix TLS" series (Onyx Chemical Co.) are representative of the first "Maprofix ES" of the ether sulfates; and "Ultrawet L60" (ARCO Chem. Co.) is representative of the sulfonates. Both soaps and detergents are effective in proportions of between about 20/1 and 100/1 of the soap or detergent to the aminohalobiphenyl compounds.

EXAMPLE 22

0.5% by weight of N-(nonachlorobiphenyl)-aminopropyl-N',N'-dimethylamine was added at levels of 1% and 0.5% by weight, respectively, to a triethanolamine salt of "Antara LM 500" (a complex organic phosphate ester produced by General Aniline and Film Corp.) and to "Mahogany Sulfonate" (a petroleum sulfonate produced by Humble Oil and Refining Co.), both being examples of metal-working fluids.

A series of 24 hour broth cultures of *Escherichia coli*, *Pseudomonas aeruginosa*, *Bacillus* species, *Proteus* species and *Aerobacter aerogenes* were pooled, diluted with sterile broth and inoculated into the 100 ml. samples to provide 1 to 10×10⁶ bacteria cells per ml. of the samples.

At weekly intervals up to nine weeks, the samples were examined to determine the number of viable organisms present. At the five week point, each jar was reinoculated as before, and the testing continued. The counts are given in the following table in which the count is to be multiplied by 10³.

TABLE 5

N-(nonarchlorobiphenyl)-aminopropyl-N',N'-dimethylamine

| Fluid, compound | Agent, p.p.m. | Weeks | | | | | | | |
|---|---|---|---|---|---|---|---|---|---|
| | | 0 | 1 | 2 | 3 | 4 | 5 | 7 | 9 |
| Phosphate | 0 | 4,200 | 23,000 | 18,300 | 14,200 | 12,600 | 11,800 | 10,000 | 6,300 |
| Do | 200 | 4,200 | 600 | 520 | 480 | 510 | 470 | 390 | 380 |
| Sulfonate | 0 | 4,200 | 22,000 | 16,500 | 12,900 | 13,100 | 12,800 | 13,400 | 9,600 |
| Do | 200 | 4,200 | 430 | 7,400 | 5,400 | 3,800 | 2,900 | 3,210 | 370 |

The term "metal-working fluids," as used herein, are those discussed in "Metalworking Lubricants" by E. L. H. Bastian (McGraw Hill Co., 1951, pp. 5–56). The present compounds have biocidal utility when intermixed in biocidally effective amounts wth the fluids disclosed in this publication.

EXAMPLE 23

The efficacy of mixtures of the mono-aminosubstituted halobiphenyls of Examples 1 to 4 with the bis-amino-substituted halobiphenyls such as those of Examples 15–16 was compared by bacteriological assay. Among the combinations were the following mono- and bis- derivatives halobiphenyls of diethylene triamine, with and without the presence of the "Aroclor" from which they were prepared, namely, "Aroclors 1242, 1254, 1260, and 1268."

In each case, the following mixtures were prepared:

Mono 80% _____ Bis 20%.
Mono 20% _____ Bis 80%.
Mono 60% _____ Bis 20%, "Aroclor" 20%.
Mono 20% _____ Bis 60%, "Aroclor" 20%.
"Aroclor" _____ 100%.

The mixtures in general showed effective antibacterial activity, while the "Aroclor" from which they were derived had negligible activity.

EXAMPLE 24

The N-(pentachlorobiphenyl)-diethylenetriamine of Example 1 was reacted with a series of fatty acids to form imidazolines.

An agitated, round-bottomed flask fitted with a thermometer and a take-off condenser was charged with 215 grams (or 0.5 mol) of the amino compound, and 75 grams (or 0.5 mol) of caprylic acid. The mixture was heated for about two hours at 160° C. at atmospheric pressure, during which time the greater part of one mol of water was distilled off. The heating was contineud for another half hour while drawing a vacuum to about 25 mm. pressure. On cooling the loss in weight was found to be about 17 grams, indicating the formation and removal of two mols of water per mol of fatty acid resulting from the amidification and the closing of the ring. After acetylating an aliquot of the product, titration with standard perchloric acid indicated essentially complete conversion to the imidazoline. The yield was essentially 100%, as 1-(pentachlorobiphenylaminoethyl)-2-heptyl imidazoline in the form of a light-amber paste.

Instead of the amino compound of Example 1, the corresponding amino compounds derived from triethylene tetramine or tetraethylene pentamine may be employed to yield the corresponding imidazolines.

In the same manner, imidazolines were prepared, substituting for caprylic acid a corresponding molar amount respectively, of acetic, propionic, butyric, valeric, caproic, oenanthic, pelargonic, capric, undecylenic, lauric, myristic, palmitic, and stearic acids.

EXAMPLE 25

In the same manner as in Example 24, imidazolines were prepared with the fatty acids of that example, with the product of Example 2. For example, 512 grams of the N-(nonachlorobiphenyl) diethylene triamine (or 1 mol) was reacted with 172 grams (or 1 mol) of capric acid, to yield 1-(nonachlorobiphenylaminoethyl)-2-nonylimidazoline, as a very viscous amber oil.

Instead of the diethylenetriamine derivatives of Example 2, the corresponding derivatives from triethylene tetramine or tetraethylene pentamine may be used, and the $C_8$ to $C_{18}$ acids may replace the capric acid, to yield the corresponding imidazolines.

The imidazolines may be converted into their salts by treatment with the appropriate acid; or they may be quaternized if desired by reaction with agents such as are listed in Example 6.

The above imidazolines exhibited distinct microbiocdal activity.

In general, unless otherwise specified, wherever parts or proportions have been used herein, it refers to parts by "weight."

The compounds or mixtures thereof or their salts and other derivatives exemplified above may be applied to the treatment of industrial water, both for use in cooling towers, air-conditioners, humidifiers and de-humidifiers and the like, and for use in process water as for example in paper manufacture, to control the growth of microorganisms and to prevent slime formation.

The products of this invention are also effective preservatives against microbial growth and action in cosmetic preparations such as creams, lotions, shampoos, and the like, when present therein in a proportion of about 0.25% to 2% by weight of the composition, preferably about 0.5%, to prevent discoloration, putrefaction, phase separation, etc., and to prevent infection resulting from the use of such contaminated cosmetics.

They may also be introduced into metal-working fluids, to preserve them against microbial action which results in decomposition and putrefaction, or breaking of emulsions, or to prevent dermatitis resulting from contact with spoiled cutting and grinding oils and the like.

They may also be used in detergents, including bar soap, as, for example, for a germicidal soap.

They may also be applied to inanimate hard or soft surfaces, such as hospital walls, floors and the like and to textiles, rugs and the like, to render them bacteriostatic or bacteriocidal.

The invention claimed is:

1. N-(pentachlorobiphenyl) ethylene diamine.

References Cited
UNITED STATES PATENTS 3,663,620  5/1972  Merianos et al. ____ 260—570.5

ROBERT V. HINES, Primary Examiner

U.S. Cl. X.R.

424—70, 250, 266, 273, 287, 289, 294, 295, 324, 329, 330; 260—268 PH, T, 295.5 A, 309.6, 404.5, 429 R, 429.9, 438.1, 439 R, 448 R, 459, 501.2, 501.21, 558 R, 558 D, 556 F, 657.6 M, 567.6 P, 578; 21—76; 99—150 R; 106—243; 148—22; 162—72; 252—8.8, 106, 107, 117, 175